(12) United States Patent  
Neubrand

(10) Patent No.: US 6,217,104 B1
(45) Date of Patent: Apr. 17, 2001

(54) RETRACTABLE HARD TOP MODULE

(75) Inventor: Frank G. Neubrand, Auburn Hills, MI (US)

(73) Assignee: CTS Fahrzeug Dachsysteme GmbH (DE)

( * ) Notice: Subject to any disclaimer, the term of this patent is extended or adjusted under 35 U.S.C. 154(b) by 0 days.

(21) Appl. No.: 09/334,763

(22) Filed: Jun. 16, 1999

(51) Int. Cl.$^7$ .................................................. B60J 7/14
(52) U.S. Cl. ............... 296/108; 296/107.08; 296/107.18
(58) Field of Search ............... 296/108, 107.16–107.19, 296/107.08, 76, 136

(56) References Cited

U.S. PATENT DOCUMENTS

| | | |
|---|---|---|
| 2,001,224 | 5/1935 | Tames . |
| 2,038,490 | 4/1936 | Hamel . |
| 3,175,858 | 3/1965 | Dehn . |
| 3,180,677 * | 4/1965 | Scott ................................. 296/107.2 |
| 4,487,447 | 12/1984 | Schroder . |
| 4,553,784 | 11/1985 | Trenkler . |
| 4,842,326 | 6/1989 | DiVito . |
| 4,929,015 | 5/1990 | Bauer . |
| 5,035,461 | 7/1991 | Zweigart . |
| 5,078,447 | 1/1992 | Klein et al. . |
| 5,090,764 | 2/1992 | Kogawa et al. . |
| 5,195,798 | 3/1993 | Klein et al. . |
| 5,197,778 | 3/1993 | Burst . |
| 5,265,930 | 11/1993 | Klein et al. . |
| 5,445,429 | 8/1995 | Koehler et al. . |
| 5,533,777 * | 7/1996 | Kleemann et al. ............. 296/107.08 |
| 5,622,382 | 4/1997 | Zepnik et al. . |
| 5,641,193 | 6/1997 | Zepnik et al. . |
| 5,671,947 | 9/1997 | Henn . |
| 5,707,101 | 1/1998 | Rice . |
| 5,785,375 * | 7/1998 | Alexander et al. ................... 296/108 |
| 5,823,606 | 10/1998 | Schenk et al. . |
| 5,881,458 | 3/1999 | Wolf et al. . |

FOREIGN PATENT DOCUMENTS

| | | |
|---|---|---|
| 43 20 468 C1 | 10/1994 | (DE) . |
| 44 31 656 C1 | 12/1995 | (DE) . |
| 196 34 507 C1 | 1/1998 | (DE) . |
| 196 34 510 C1 | 1/1998 | (DE) . |
| 196 34 511 C1 | 1/1998 | (DE) . |
| 196 35 536 C1 | 1/1998 | (DE) . |
| 196 35 869 C1 | 1/1998 | (DE) . |
| 44 46 483 C2 | 2/1998 | (DE) . |
| 197 06 444 C1 | 6/1998 | (DE) . |
| 197 06 398 A1 | 8/1998 | (DE) . |
| 0 826 537 A1 | 3/1998 | (EP) . |
| 0 826 539 A1 | 3/1998 | (EP) . |

* cited by examiner

*Primary Examiner*—Dennis H. Pedder
(74) *Attorney, Agent, or Firm*—Brooks & Kushman P.C.

(57) ABSTRACT

A retractable hard top for a vehicle including a linkage and a top guide track for moving the hard top from a top up position to a stowed position. As the retractable hard top is moved between the top up and stowed positions the trunk is raised by movement along a track to which the trunk linkage is connected. The retractable hard top linkage includes a pivot bracket that is movable within the top guide track to limit the clearance necessary for folding the hard top into a stowed position. A tonneau is provided to cover the retractable hard top storage area in both the top up and stowed position. Rear quarter windows are shifted from a top up position in which they function as windows to a stowed position in which the windows are shifted outboard of the retractable hard top and rotated to a stowed position. The retractable hard top, trunk lid, rear quarter window, tonneau, and roll bar may be assembled as a single unitary module with the linkages that coordinate operation of the retractable hard top, trunk lid, rear quarter window, and tonneau to facilitate assembly to a vehicle.

12 Claims, 15 Drawing Sheets

RETRACTABLE HARD TOP MODULE

TECHNICAL FIELD

This invention relates to retractable hard top vehicle roofs and related vehicle components that facilitate roof retraction and extension.

BACKGROUND ART

Motor vehicles generally are provided with a rigid roof structure completely enclosing the top of the passenger compartment. In some instances a sunroof may be provided at an additional cost to provide some overhead ventilation, however, the size of the vehicle sunroofs is normally very limited. Vehicle roofs with sunroofs do not in any way approach the ventilation, openness and panoramic view that is available with a convertible roof.

Conventional convertibles have a soft top that is folded into a series of folds that are stretched over three or four convertible top bows when the top is in its extended, or up, position. Convertible soft tops are prone to problems including excessive noise and potential water leakage. Soft tops are also generally less durable than a hard top and may require replacement periodically during the life of the vehicle. Some of the difficulties with the soft top convertibles result from the fact that they are not particularly well suited to winter weather. Cold temperatures, ice and snow that are encountered in winter discourage consumers from selecting convertible style vehicles even though the consumers may want a convertible for summer driving. In winter, water leakage through the convertible roof can make driving unpleasant and cause water damage to the interior of the vehicle. A soft top can make a vehicle difficult to heat due to heat transfer through the convertible top unless it is lined and insulated. If a convertible top is lined and insulated, reduction in noise levels and better heat retention may be achieved but the top becomes more bulky and requires more space within the vehicle for stowage.

Retractable hard tops offer the advantages of a hard top roof and a convertible in that they provide a durable vehicle roof that is not prone to excessive noise levels or leakage and provides excellent durability. However, retractable hard tops generally require complex linkages and drive mechanisms. For example, U.S. Pat. No. 5,823,606, discloses a system in which the trunk is provided with a dual hinge mechanism to allow it to be opened in the conventional manner on a forward hinge and to be tipped about its rear edge on an auxiliary rear hinge. In addition, a relatively large storage compartment must be provided to permit the retractable hard top to be folded and then moved into its storage compartment. Depending upon the size of the roof and trunk area of the vehicle, it may be difficult or impossible to configure a retractable hard top according to prior art designs that would still leave sufficient space in the trunk for useful storage. In addition to providing space for storing the retractable hard top, if an automatic hard top is provided, there must be adequate clearance between the trunk lid, wheel housings, floor of the vehicle and belt line of the vehicle so that the hard top may be automatically retracted without interference from other vehicle elements.

Assembly of convertible tops and retractable hard tops has generally been accomplished by taking separate components including the top and its associated linkage and the tonneau and its associated linkage and assembling them to a partially constructed vehicle on an assembly line. Alternatively, convertibles have been manufactured by removing the roof structure of a conventional coupe, reinforcing the frame and then installing the convertible top and tonneau. In either method the trunk lid is assembled as part of the vehicle entirely separately from the top. Likewise, if a roll bar is provided it is entirely separate from the top and from the trunk lid prior to assembly to the vehicle. These assembly methods are inefficient and add operations to the final vehicle assembly process. Also, testing and adjustment of various systems relating to the operation of the trunk lid, tonneau and top are required post assembly to the vehicle including integration of electrical connections, hydraulic systems and mechanical linkages.

These and other problems and design objectives are addressed by the present invention as summarized below.

DISCLOSURE OF INVENTION

The advances embodied in the present invention may be applicable to retractable hard tops and soft convertible tops. The present invention includes improvements in the top alone and in combination with a power tonneau cover, trunk lid, and rollbar. The invention also offers advantages relating to modular assembly techniques involving the retractable top, trunk, tonneau and rollbar.

According to one aspect of the present invention, a retractable top system is disclosed for a vehicle that has a body and a passenger compartment. The vehicle top system includes a roof formed in at least two sections that are pivotally connected to each other and to the vehicle body and are movable between a top up position and a stowed position by a roof linkage. The roof linkage includes right and left pivot brackets that each have first and second portions pivotally connected respectively to the roof sections and a third portion pivotally and slidably connected respectively to right and left roof guide tracks. In the top up position, the roof covers a passenger compartment. In the stowed position, the passenger compartment is uncovered. The two sections of the roof are adjoined in the top up position and are folded together in the stowed position. The roof pivot brackets are moved along roof guide tracks as the roof is moved between the top up position and the stowed position. The system is preferably powered by a motor that is operatively connected to the roof linkage for moving the top between the top up and stowed positions.

The retractable top linkage includes a front roof assembly a rear roof assembly that are connected by right and left balance links. Each balance link pivotally connects one side of the front roof assembly to one of the first and second portions of the right and left roof pivot brackets to provide a balance link pivot mount. The linkage further includes right and left control links that are connected to right and left body mounted pivots on a first end and to a controlled member on a second end. The control member is pivotally connected to the right and left roof pivot brackets respectively. The controlled member may be either a pivotal connection at a lower intermediate portion of the rear roof assembly or may be a pivot connector on the balance link that extends between the front roof assembly and roof pivot brackets.

The roof pivot brackets each guide movement of the front and rear roof assemblies. The right and left roof pivot members connect the roof pivot brackets for movement relative to the right and left roof guide tracks. The balance links connect the roof pivot brackets to the front roof assembly to move the front and rear roof assemblies between their top up and folded positions. The rear roof pivot mounts of the roof pivot brackets guide the lower edge of the rear roof assembly along the right and left roof guide tracks forward and downward into a storage compartment of the trunk as the front roof assembly is folded toward the rear roof assembly.

According to another aspect of the invention, the retractable vehicle top system may be incorporated in a vehicle having a trunk lid that has a linkage that raises the trunk lid as it pivots to provide additional clearance for the retractable vehicle top system as it moves between the top up position and the stowed position. The retractable roof and trunk lid combination includes a roof formed in at least two sections that are pivotally connected to each other by a roof linkage to the vehicle body. The roof linkage includes right and left roof pivot brackets that are connected to right and left sides of the vehicle body by right and left roof pivot members received in right and left roof guide tracks. A trunk lid is connected to both sides of the vehicle body by a trunk lid linkage. The trunk lid linkage includes right and left movable trunk lid pivot members that are received in right and left trunk lid tracks. The movable trunk lid pivot members are connected to the trunk lid and the vehicle body. The roof has a top up position wherein the roof covers the passenger compartment in a stowed position wherein the passenger compartment is uncovered. Two sections of the roof are adjoined in the top up position and are folded together in the stowed position. The roof pivot brackets are moved along the roof guide tracks as the roof is moved between the top up position and the stowed position. The trunk lid has a closed position in which the trunk lid covers the trunk and an open position in which access is provided to the trunk. In the open positions movable trunk lid pivot members are shifted rearwardly and upwardly by moving the trunk lid pivot members in the trunk lid tracks from the position that the pivot members are in when in the closed position to thereby provide clearance for the roof as the roof is moved between the top up position and the stowed position.

A motor may be connected to the vehicle and trunk lid linkage or connected between two relatively movable parts of the trunk lid linkage. A separate motor may be provided for the retractable top and the trunk lid or both may be powered by a single motor.

The trunk lid assembly includes several novel features. The trunk lid assembly includes a trunk lid having a closed position and a raised position. Right and left arcuate support arms are affixed to right and left sides of the trunk lid on their back ends and have a roller on their front ends. Right and left tracks each have a forward end and a rearward end. The tracks are mounted on right and left sides of the vehicle. The tracks receive the rollers on the front ends of the support arms. Right and left trunk lid control arms are pivotally secured to right and left sides of the vehicle. Rollers are disposed in the forward ends of the tracks and the control arms are pivoted forward when the trunk lid is in the forward position. The rollers are disposed in the rearward ends of the tracks and the control arms are pivoted upwardly from their forward position when the trunk lid is in the raised position so that the whole trunk lid is raised upwardly as the trunk lid support arms are pivoted to move the trunk lid to the raised position. The trunk lid assembly may be operable by either a motor or by hydraulic cylinders. The motor or hydraulic cylinders may be connected to right and left sides of the vehicle and right and left trunk lid support arms. The hydraulic cylinders may also be connected to right and left trunk lid control arms and right and left trunk lid support arms to move the trunk lid between its closed and raised positions. Alternatively, the trunk lid assembly may include right and left hydraulic cylinders that are connected to right and left sides of the vehicle and the right and left trunk lid control arms to move the trunk between its raised and closed positions.

According to another aspect of the invention, a rear quarter window assembly for a vehicle is provided that is carried by the retractable top. The rear quarter window is carried by the retractable top as the top is moved between a closed position and a stowed position. In the closed position, the window is contiguous with the belt line of the vehicle to cover an opening defined between the top and the belt line of the vehicle. In the stowed position, the window is carried by a retractable top but is not contiguous with the retractable top or the belt line of the vehicle. The window/top control arm is pivotally connected to a rear portion of the retractable top and is pivotally connected to the rear quarter window. A cam pivotally connects a lower portion of the rear quarter window to the retractable top. The rear quarter window is moved by the retractable top after the retractable top moves clear of the rear quarter window. The rear quarter window is rotated by the window/top control arm about the cam.

According to another aspect of the invention as it relates to the rear quarter window assembly, a longitudinally extensible roller cam pivotally connects a lower rear corner of the rear quarter window to the retractable top. The rear quarter window is moveable laterally outboard of the retractable top by extension of the roller cam to allow the retractable top to move clear of the rear quarter window. The rear quarter window is rotated by the window/top control arm about the roller cam to a position laterally outboard of the retractable top.

Another aspect of the present invention relates to the power tonneau cover assembly in conjunction with the retractable top. The power tonneau cover assembly includes right and left pivot brackets movably connected to right and left tracks that are mounted on the vehicle. The tonneau cover assembly includes a tonneau cover having right and left fixed pivot mounts and right and left pivot link mounts. Right and left bell cranks each are pivotally connected at a first connection point to the right and left pivot brackets of the retractable top. Right and left front tonneau cover control links each have a first end pivotally connected to the tonneau cover and a second end pivotally connected to a second connection point on the bell crank. Right and left rear tonneau cover control links each have a first end pivotally connected to right and left sides of the retractable top and a second end pivotally connected to a third connection point on the bell crank. The front tonneau cover control links lift the tonneau cover from a generally horizontal orientation to a generally vertical orientation at the beginning of the retractable top cycle. The pivot brackets move in the tracks causing the tonneau cover to return to the horizontal orientation after the retractable top has moved to a position below the tonneau cover. The rear tonneau cover control links are moved by the retractable top to rotate the bell crank providing a motive force for moving the tonneau cover and providing cooperation between the retractable top and the tonneau cover.

According to another aspect of the invention, the retractable vehicle top as previously described and tonneau cover assembly may be provided as a combination including structural elements previously described. The retractable vehicle top and tonneau cover assembly combination may include roof pivot brackets that guide the movement of the front and rear roof assemblies with the right and left roof pivot members connected in roof pivot brackets for movement relative to the right and left roof guide tracks. The balance link connects the roof pivot brackets to the front roof assembly to move the front and rear roof assemblies between the top up and folded position. The rear roof pivot mount of the roof pivot brackets guide the lower edge of the rear roof assembly along right and left roof guide tracks forward and downward into a storage compartment of the trunk as the front roof assembly is folded toward the rear roof assembly.

According to another aspect of the invention, an outer tonneau cover may be secured to the trunk lid for sliding movement on the trunk lid toward and away from the inner tonneau cover that is attached to the retractable top and frame to open and close an opening defined by a front edge of the trunk lid and the rear edge of the inner tonneau cover.

According to another aspect of the invention, a retractable vehicle top, trunk lid and tonneau cover assembly may be provided in combination for a vehicle including many of the structural elements previously described with respect to each element separately. Likewise, a retractable vehicle top, rear quarter window, tonneau cover assembly may be provided as a system incorporating the structural elements previously described with respect to each of the components.

According to another aspect of the invention, a modular convertible top for a vehicle is disclosed in which a frame that is adapted to be secured to the vehicle is used to mount a retractable top and tonneau cover prior to assembly to the vehicle. The frame, retractable top and the inner tonneau cover are all installed in the vehicle simultaneously as a unit.

Another aspect of the modular convertible top concept, is to provide a trunk lid that is secured to the frame that is also installed in the vehicle simultaneously and as a unit with the frame, retractable top and inner tonneau cover.

The modular convertible top concept may also comprise including a roll bar that is secured to the frame and installed with the other components simultaneously as a unit.

The invention also comprehends a method of assembling a convertible top and related components to a vehicle wherein the retractable top and related components are assembled to a frame prior to assembly to the vehicle and wherein the assembly is secured as a unit to the vehicle.

These and other aspects of the present invention will be better understood in view of the attached drawings and detailed description of several embodiments of the invention that follows.

BEST MODE FOR CARRYING OUT THE INVENTION

Figure 1:
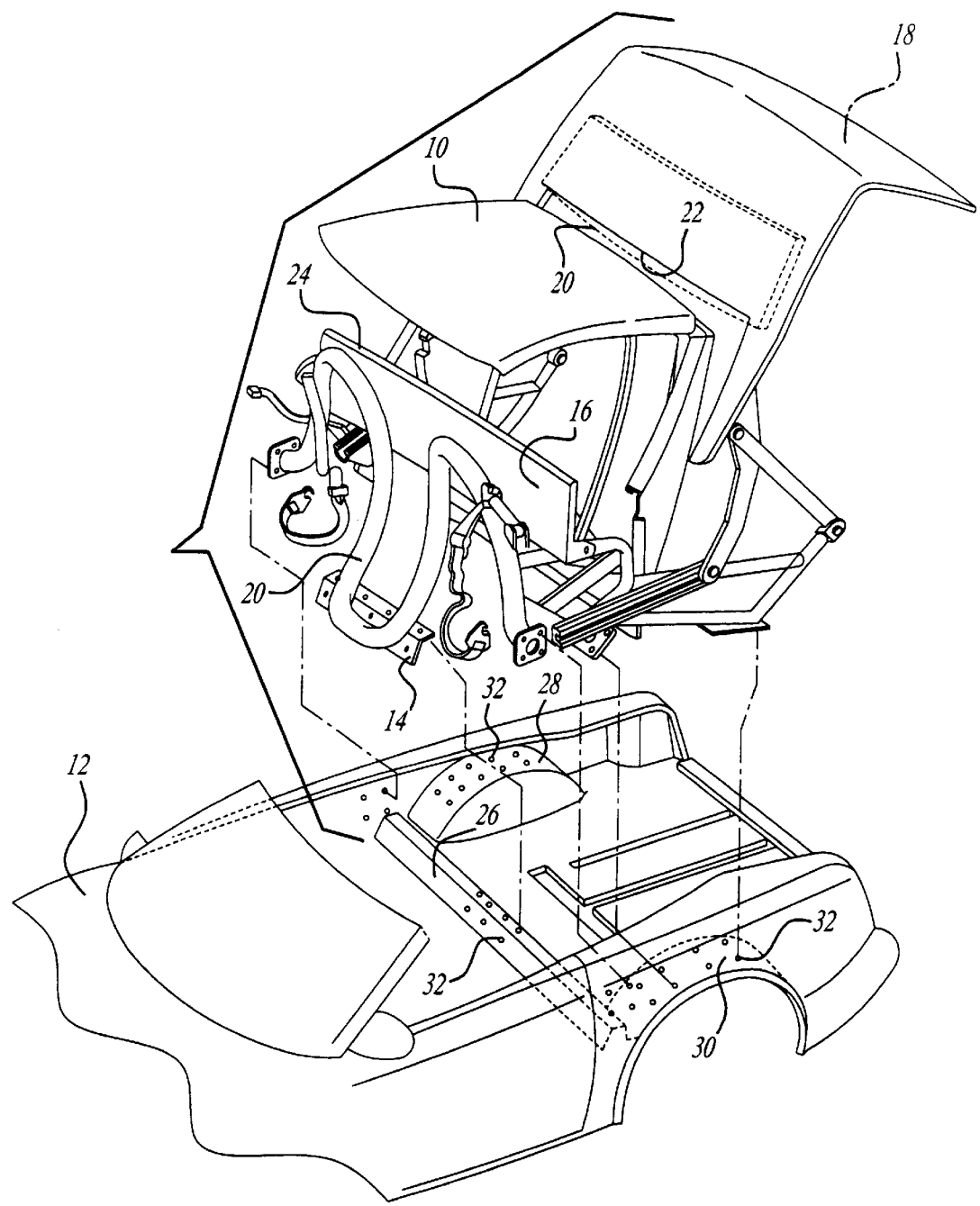
FIG. 1 is an exploded perspective view showing the modular concept of the present invention wherein a retractable top, power tonneau, trunk lid and roll bar are assembled to each other and a frame including mounting brackets and installed as a unit simultaneously in a vehicle.

Referring now to FIG. 1, a retractable top 10 for a vehicle 12 is shown as a modular construction including a frame 14, inner tonneau cover 16 and trunk lid 18 that are installed as a unit in the partially assembled vehicle 12. The frame 14 is secured to the retractable top 10, inner tonneau cover 16 and trunk lid 18 that will be more particularly described below. The trunk lid 18 includes an outer tonneau cover 20 that is assembled to the trunk lid 18 in a sliding relationship similar to the sliding mechanism used for power sunroofs. The front edge of the trunk lid 22 and a rear edge of the inner tonneau 24 define the space covered by the outer tonneau cover 20 when it is extended from the trunk lid 18. Main bracket 26 and right and left wheel housing brackets 28 and 30, respectively, are secured to or are formed as parts of other components of the vehicle such as the floor and wheel housings. Holes 32 are provided for fasteners to be received in for securing the modular assembly to the vehicle 12.

Referring to FIGS. 2-8, the structure and operation of the retractable roof 10 is described. The retractable top 10 in the illustrated embodiment includes a front roof assembly 36 and a rear roof assembly 38. The front and rear roof assemblies 36 and 38 are interconnected by a hinge pin 40 and hinge flange 42. The hinge pin 40 is associated with the rear roof assembly 38 and the hinge flange 42 extends rearwardly from the rear edge of the front roof assembly 36. The roof linkage generally indicated by reference numeral 44 controls retraction and extension of the retractable top 10. The roof linkage 44 is symmetrical and includes right and left roof linkages on the right and left sides of the vehicle 12. For brevity, only the left side of the roof linkage 44 is shown. However, it should be understood that a right side linkage is also provided as part of the roof linkage 44. The right side roof linkage is substantially identical in all material respects to the left side linkage and its description will not be repeated.

The roof linkage 44 includes a roof pivot bracket 46 comprising a generally y-shaped member having a track follower member 48 on one part of the roof pivot bracket 46 that is received for sliding movement along the roof guide track 50. A pivot connector 52 is provided on another portion of the roof pivot bracket 46. The pivot connector 52 connects the roof pivot bracket 46 to the rear roof assembly 38. A pivot pin 54 connects another part of the roof pivot bracket 46 to a balance link 56. Balance link 56 interconnects the roof pivot bracket 46 to the front roof assembly 36 at front roof pivot 58. A control link 60 is connected to a body mount pivot 62 and a roof assembly pivot 64.

A rear quarter window 66 spans the space between the belt line 68 of the vehicle 12 and the lower edge 70 of the rear roof assembly 38. A window/top control arm 72 is connected by pivot 74 to the rear roof assembly. Pivot 76 connects the other end of the window/top control arm 72 to the rear quarter window 66. A roller cam 78 is connected to the rear quarter window 66 and is longitudinally extensible to move the rear quarter window 66 outboard as the roof is retracted and is longitudinally retracted to move the rear quarter window 66 into engagement with the belt line 68 and lower edge 70 of the rear roof assembly 38 when the top 10 is in the top up position.

Figure 2:
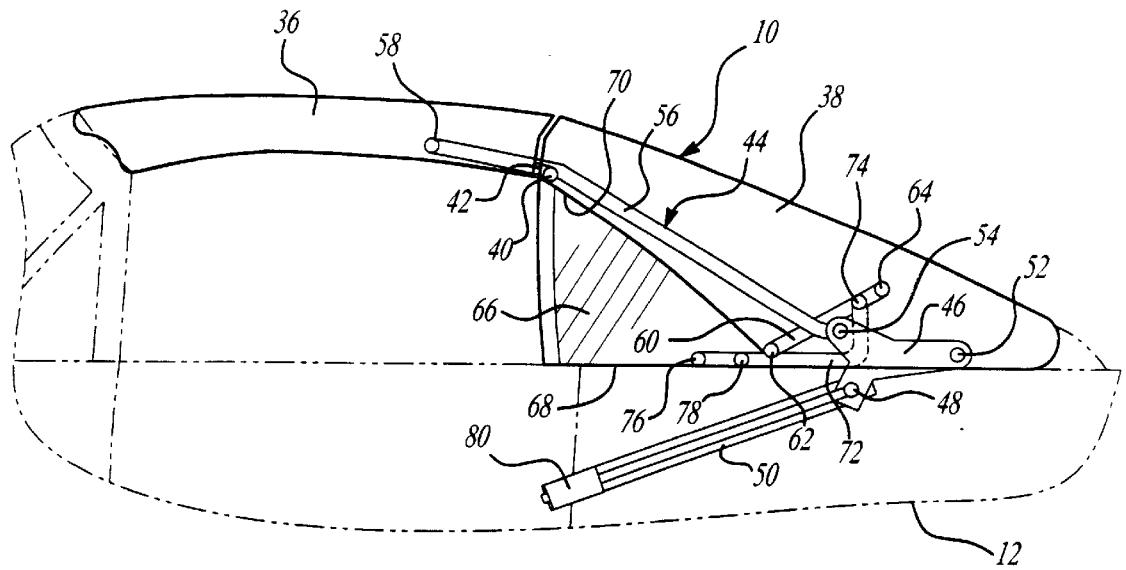
FIG. 2 is a fragmentary side elevation view of a vehicle with a retractable top made in accordance with the present invention in its top up position.

Referring now to FIG. 2, the roof pivot bracket 46 is located at the upper and rear end of the roof guide track 50 and the rear quarter window 66 is in engagement with the belt line 68 and edge 70 of the rear roof assembly 38. The front roof assembly 36 and rear roof assembly 38 are contiguous to form a hard top over the passenger compartment of the vehicle.

Figure 3:
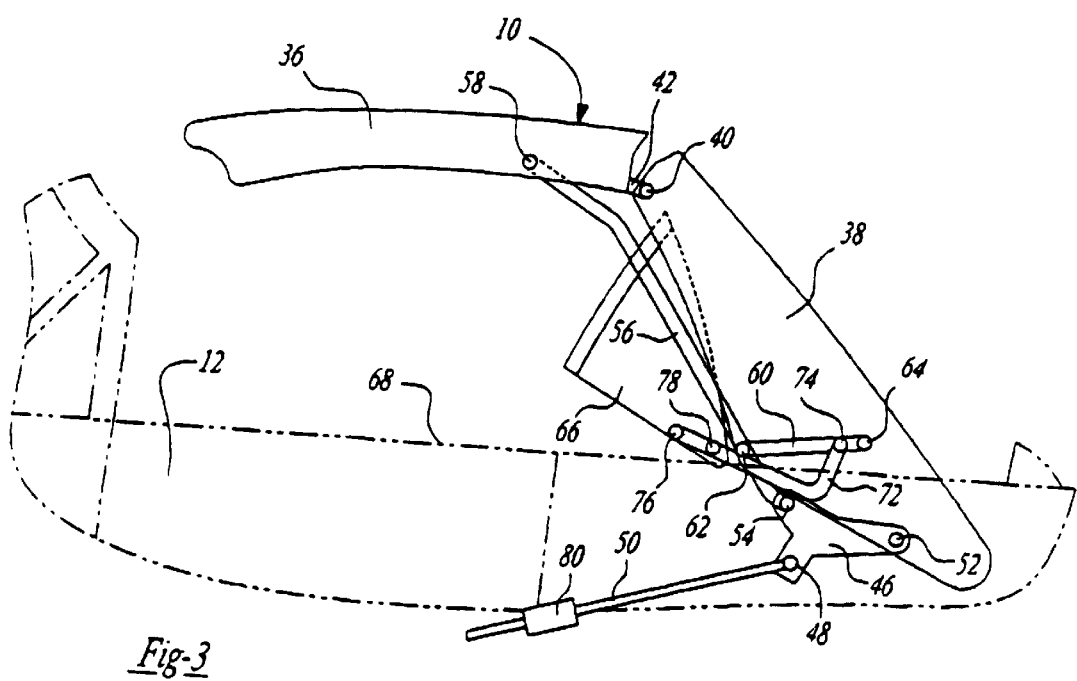
FIG. 3 is a fragmentary side elevation view of a vehicle having a retractable top made in accordance with the present invention at the beginning of the retraction cycle.

As shown in FIG. 3, the roof is in an early stage retraction position wherein the roof pivot bracket 46 has begun to move downwardly and forwardly in the roof guide track 50. The rear quarter window is extended outwardly to provide clearance between the window 66 and the outboard sides of the retractable top 10. The roof pivot bracket 46 is held in the same angular orientation by the track follower member 48 in the roof guide track 50. The front roof assembly 36 and rear roof assembly 38 are not contiguous at this phase of the retraction cycle but are held together by the hinge pin 40 and hinge flange 42 as they begin folding toward each other. The balance link 56 holds the front roof assembly 36 in a generally horizontal orientation. The balance link 56 is held in place by the roof pivot bracket 46. The rear roof assembly 38 is rotated upwardly on its front end and downwardly on its rear end by the movement of the pivot connector 52 and the control link 60. Control link 60 is anchored to the vehicle at the body mount pivot 62 and is rotated about roof assembly pivot 64. The rear quarter window 66 is rotated by the window/top control arm 72 that is connected to the rear roof assembly 36 at pivot 74. The window is connected to the window/top control arm by pivot 76 that rotates the rear quarter window 66 about the roller cam 78.

Figure 4:
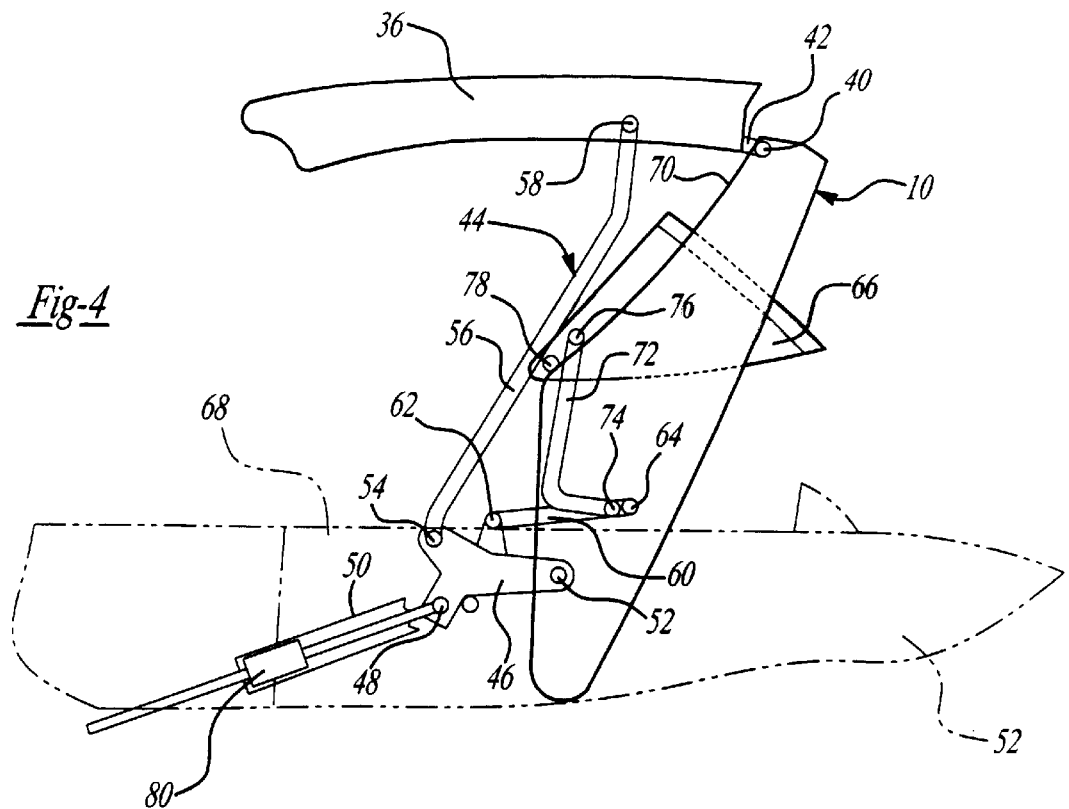
FIG. 4 is a fragmentary side elevation view of a vehicle having a retractable top made in accordance with the present invention with the retractable top at an intermediate point in the retraction cycle.

Referring now to FIG. 4, the retraction of the roof has continued to its approximate midpoint wherein the roof pivot bracket 46 has been moved by a cylinder or motor to the approximate midpoint of the roof guide track 50. The front roof assembly 36 is held in its generally horizontal orientation by the balance link 56 while the rear roof assembly has been rotated to a partially inverted position by the pivot connector 52 on the roof pivot brackets 46. The control arm 60 supports the rear roof assembly on the body mount pivot 62 as it rotates about the roof assembly pivot 64. The rear quarter window 66 is rotated by the window/top control arm 72 about the roller cam 78.

Figure 5:
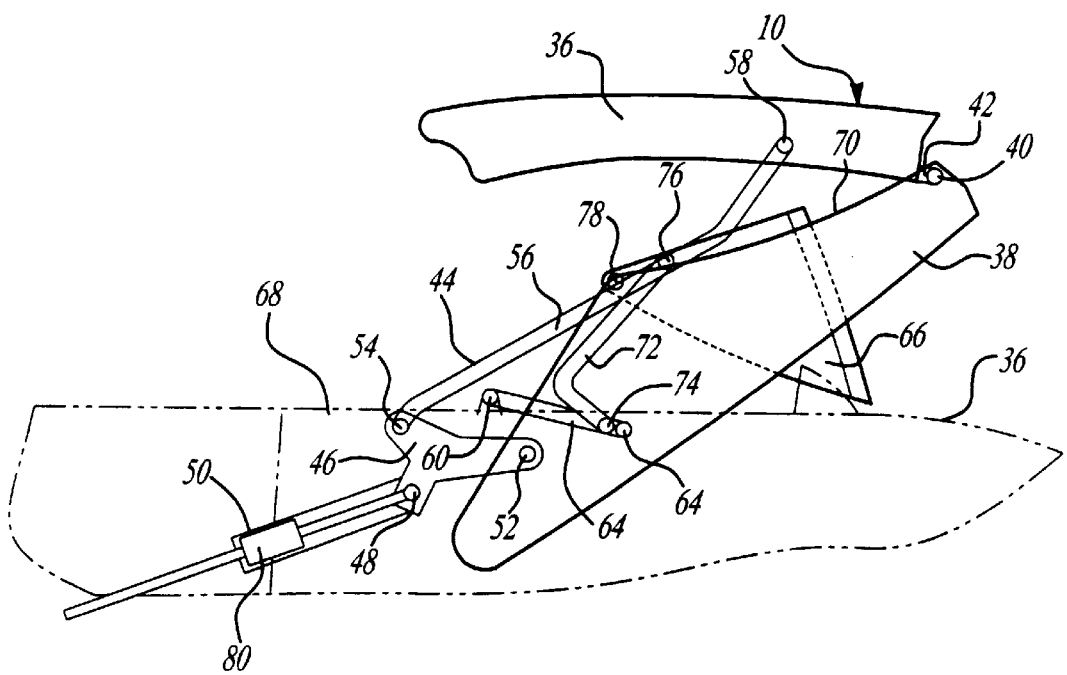
FIG. 5 is a fragmentary side elevation view of a vehicle having a retractable top made in accordance with the present invention with the retractable top at a nearly fully retracted position.

Referring now to FIG. 5, the action of the roof linkage 44 is continued to a fully retracted position and the pivot bracket 46 has moved further downwardly and forwardly on the roof guide track 50. The balance link 56 continues to hold the front roof assembly in a generally horizontal orientation as it is further folded on the hinge pin 40 and hinge flange 42 over top of the rear roof assembly 38. The rear roof assembly 38 is nearly inverted as it is rotated by the further forward advancement of the pivot connector 52 and rotated about the roof assembly pivot 64. The control link 60 moves in a clockwise direction about the body mount pivot 62. The window/top control arm 72 continues to rotate the rear quarter window 66 about the roller cam 78 that holds the window outboard of the retractable top 10 as it progresses through its retraction cycle.

Figure 6:
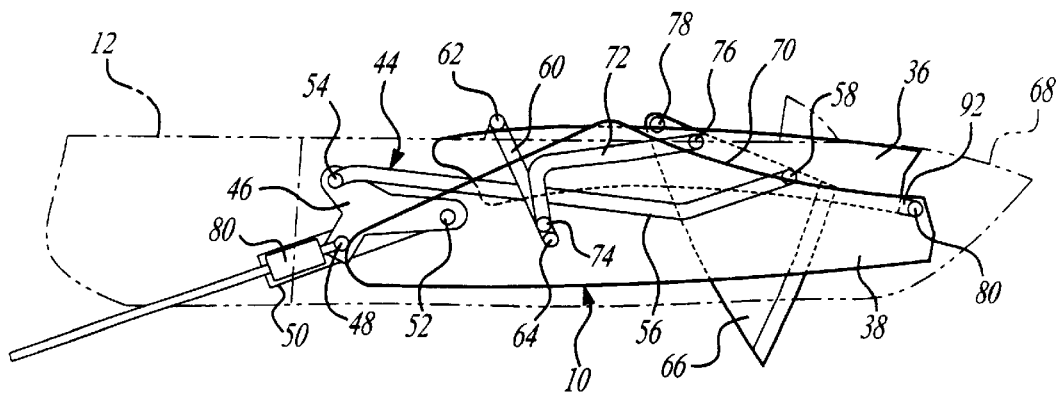
FIG. 6 is a partial side elevation view of a vehicle having a retractable top made in accordance with the present invention with the retractable top at a fully retracted position.

Referring now to FIG. 6, the retractable top 10 is shown in its fully retracted position. The roof pivot bracket 46 is at the forward and downward end of the roof guide track 50. The roof pivot bracket 46 is held in the same angular orientation by the track follower members 48 to the roof guide track 50. The control arm 56 continues to hold the front roof assembly in a generally horizontal orientation while the rear roof assembly 38 has been inverted so that the front roof assembly 36 may rest on the rear roof assembly 38. The hinge pin 40 and hinge flange 42 connect the front roof assembly 36 and rear roof assembly 38 together. The control arm 60 is disposed in a generally downward orientation suspending the rear roof assembly 38 on the roof assembly pivot 64 from the body mount pivot 62. The window/top control arm 72 is moved by the control arm 60 to a substantially inverted position relative to its position in the top up position.

Figure 7:
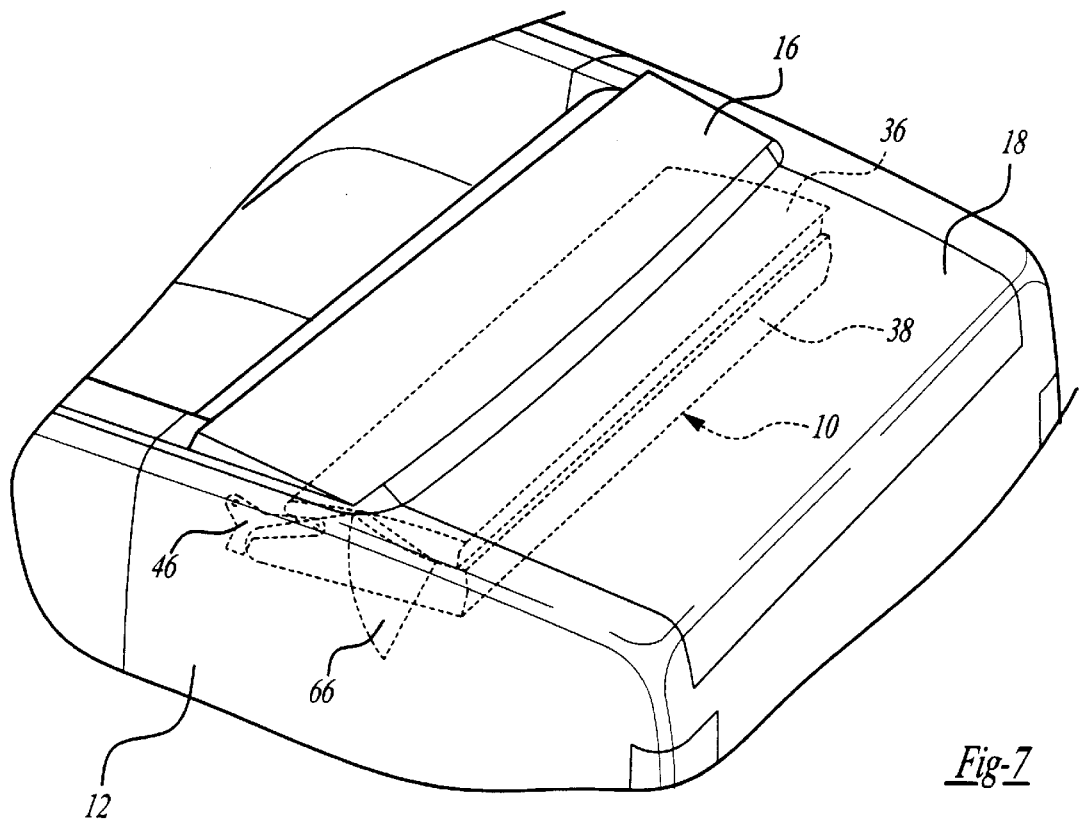
FIG. 7 is a fragmentary perspective view of a rear portion of a vehicle showing a retractable top made in accordance with the present invention with the retractable top in phantom lines as stowed in the vehicle.

When the roof is in its retracted position, as shown in FIG. 7, it may be covered by the inner tonneau cover 16 and an outer tonneau cover 20 on the trunk lid 18 of the vehicle 12. The front roof assembly 36 and rear roof assembly 38 are shown folded against one another.

Figure 8:
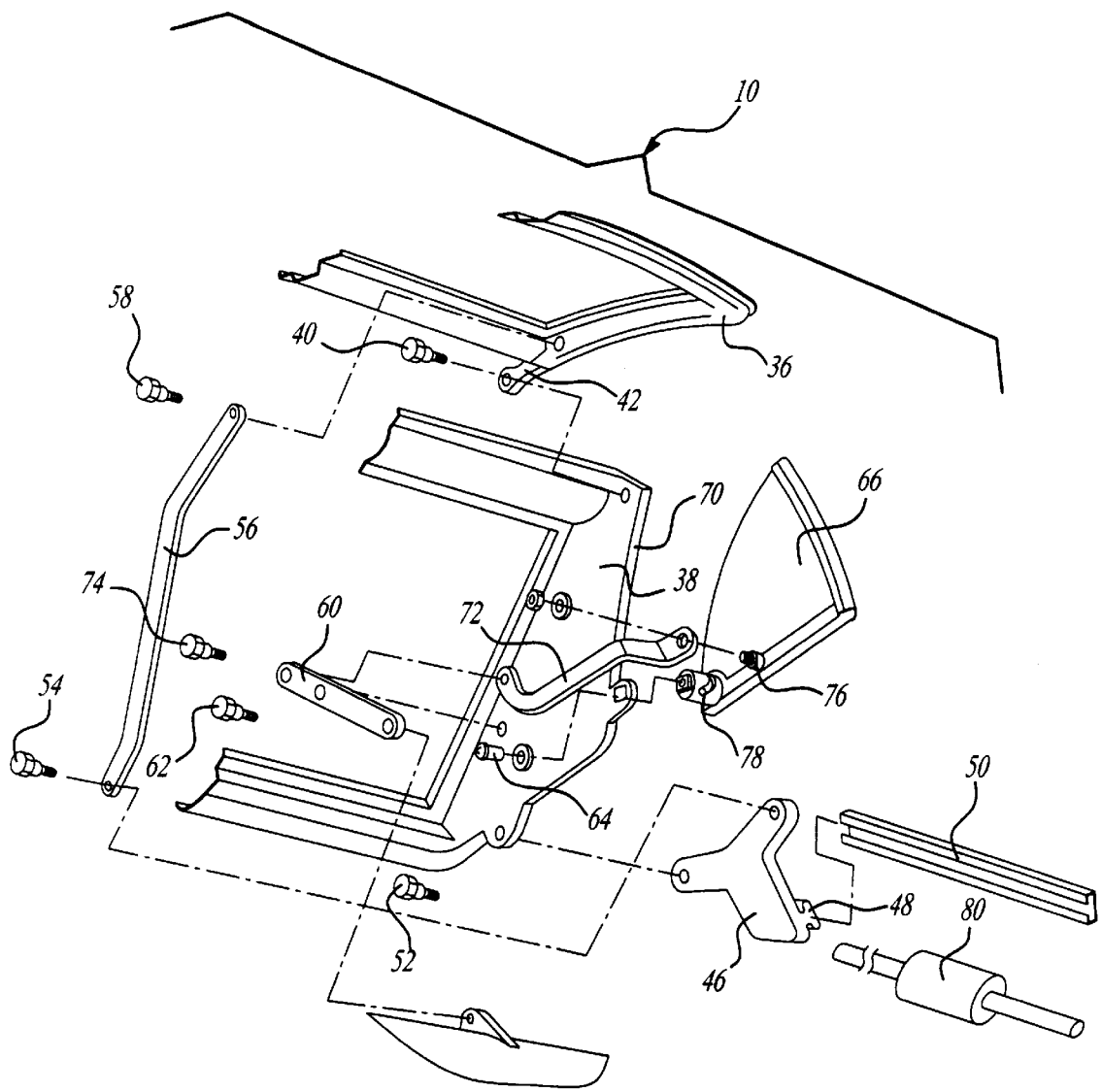
FIG. 8 is a fragmentary exploded view of the retractable top and rear quarter window made in accordance with the present invention with a portion of their associated linkages.

Referring now to FIG. 8, the tonneau parts of the retractable top are shown in exploded perspective. A drive 80 is shown that is connected to the vehicle body on one end and the pivot bracket 46 on the other end. The drive 80 may be a cylinder, cable drive, motor driven screw drive or other device that is capable of moving the roof pivot bracket 46 within the roof guide tracks 50. The track follower member 48 is shown as an extruded t-shaped member formed on one part of the roof pivot bracket 46. To reduce friction, the track follower member 48 may include a roller or other friction reducing structure. The front roof assembly 36 includes the hinge flange 42 that is connected to the rear roof assembly by the hinge pin 40. Balance link 56 is connected by pivot pin 54 to the roof pivot bracket 46 on one end while the front roof pivot 58 connects the balance link 56 to the front roof assembly 36. Window/top control arm 72 is connected a pivot 74 to the control link 60 on one end and is connected to the pivot 76 on the rear quarter window 66. Rear quarter window 66 is further controlled by the roller cam 78 about which it pivots and that is effective to move the window outward during the retraction and extension cycles.

Figure 9:
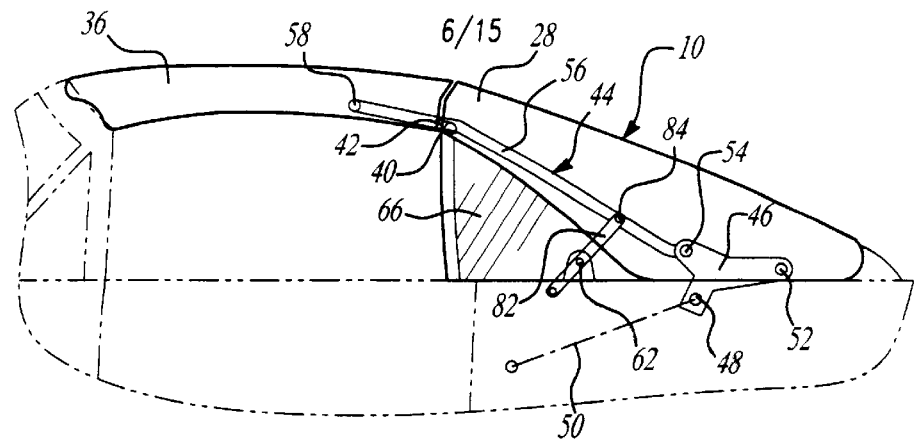
FIG. 9 is a partial side elevation view of a vehicle showing an alternative linkage mechanism according to the present invention with the retractable top in its top up position.
Figure 10:
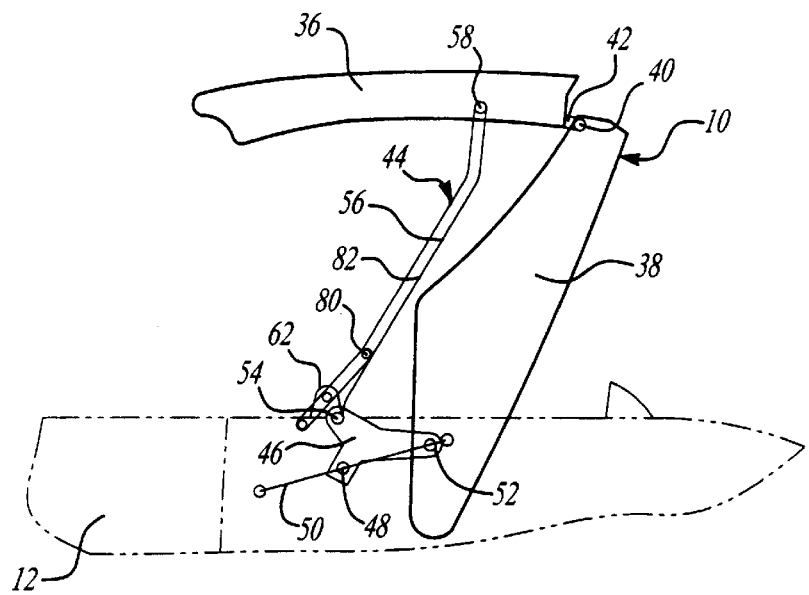
FIG. 10 is a fragmentary side elevation view of a vehicle and the embodiment of the retractable top made in accordance with the embodiment of FIG. 9 and shown in its partially retracted position.
Figure 11:
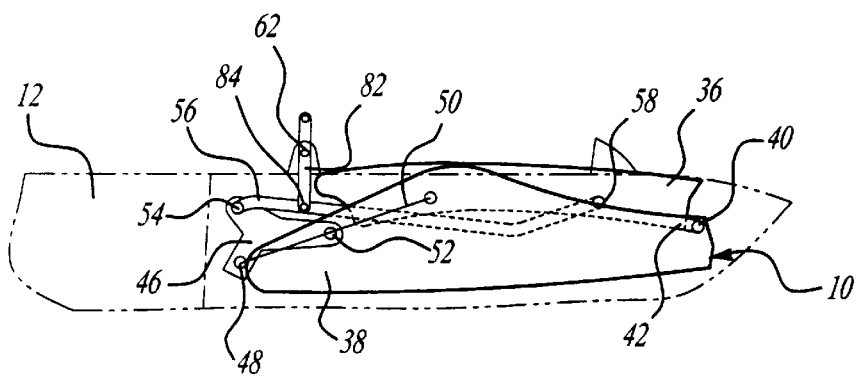
FIG. 11 is a fragmentary side elevation view of a vehicle and a retractable top made in accordance with the embodiment of FIG. 9 illustrating the top in its fully retracted position.

Referring now to FIGS. 9–11, an alternative embodiment of the roof retraction mechanism is described that is similar in many respects to the embodiment of FIGS. 2–8 but includes a different arrangement wherein the control link 82 is connected to the body mount pivot 62 on one end and is connected by a pivot 84 on the balance link 56. The control link 82 connects the balance link 56 to the vehicle at body mount pivot 62. The balance link 56 is connected by pivot pin 54 to the roof pivot bracket 46 on its lower end and to the front roof pivot 58 on the other end. In FIG. 9, the retractable top 10 is shown in its top up position. In FIG. 10, the alternative embodiment is shown with the roof at the approximate midpoint of the retraction cycle. In FIG. 11, the roof is shown in its fully retracted position with the control link 82 suspended from the body mount 62 and supporting the balance link 56.

Figure 12:
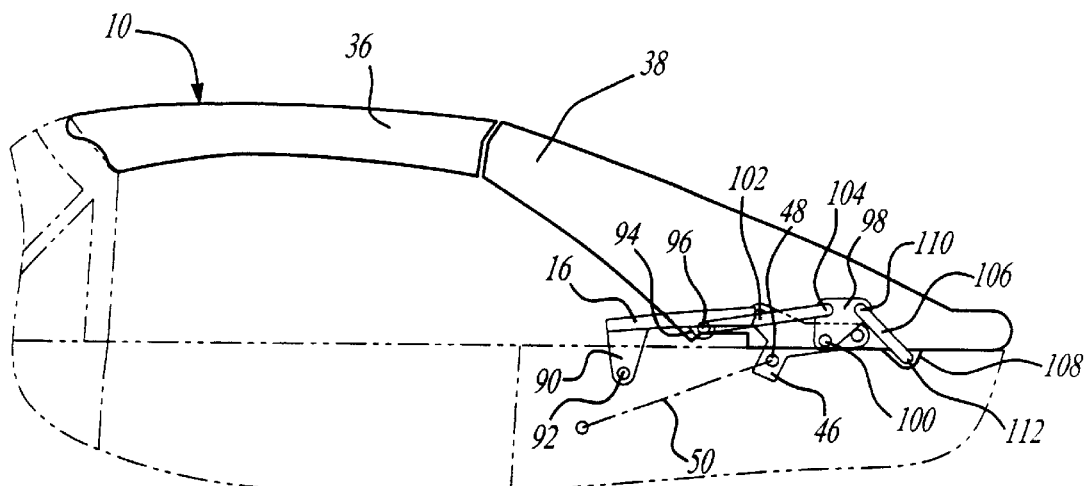
FIG. 12 is a fragmentary side elevation view of the vehicle having a retractable top and a power inner tonneau cover made in accordance with the present invention with the retractable top in its top up position.
Figure 13:
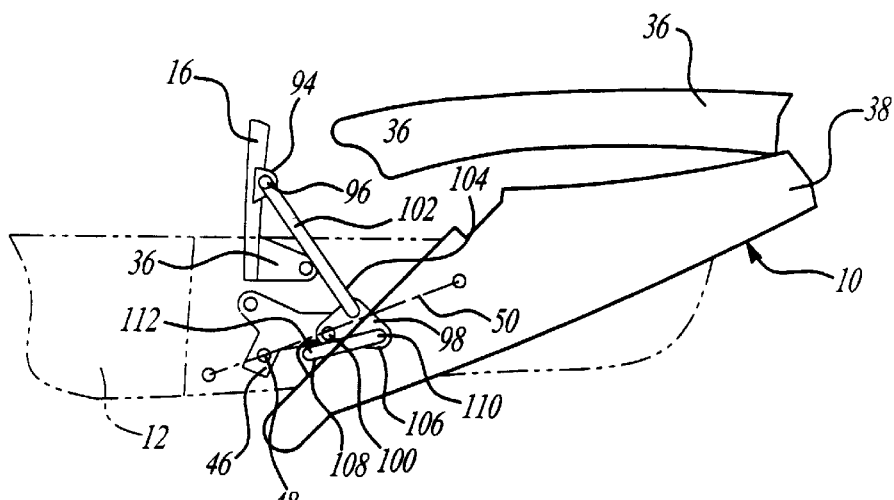
FIG. 13 is a fragmentary side elevation view of a vehicle having a retractable top and power inner tonneau cover made in accordance with the present invention with the retractable top in its nearly fully retracted position.
Figure 14:
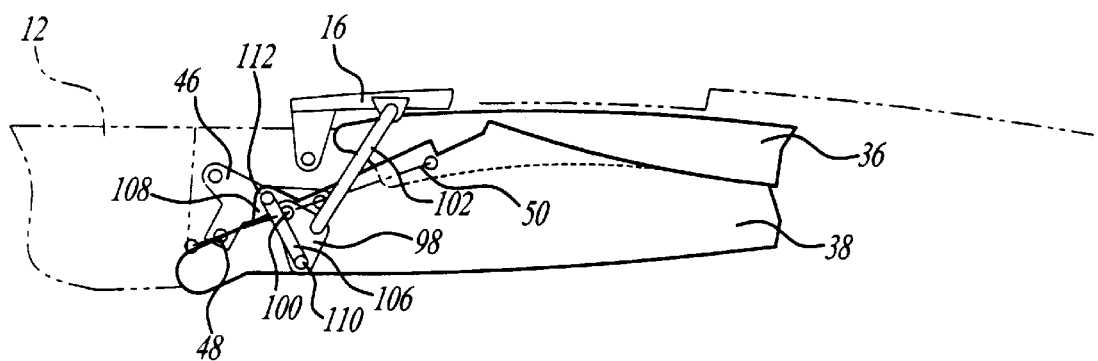
FIG. 14 is a fragmentary side elevation view of a vehicle having a retractable top and power inner tonneau cover with the top in its fully retracted position and the tonneau cover disposed above a portion of the top.

Referring now to FIGS. 12–14, the inner tonneau cover in combination with the retractable top is shown and its operation is described in conjunction with the operation of the top. A front pivot flange 90 extends from the inner tonneau cover 16 and is connected by a pivot pin 92 to the vehicle body. A rear pivot link flange 94 also extends downwardly from the inner tonneau cover 16 and is connected by a pivot link pin 96 to bell crank 98. Bell crank 98 is connected by pivot connector 100 to the roof pivot bracket 46. Roof pivot bracket 46 has previously been described as it relates to the roof retraction mechanism. A front tonneau cover control link 102 interconnects the rear pivot link flange 94 to the bell crank 98 at pivot pin 104. Rear tonneau cover control link 106 interconnects the bell crank 98 to a rear tonneau cover control link flange 108 that extends downwardly from the lower edge of the rear roof assembly 38 when the rear roof assembly 38 is in its top up position. The bell crank pivot 110 connects the rear tonneau cover control link 106 to the bell crank 98.

When the retractable top 10 is in its top up position, the inner tonneau cover 16 is preferably maintained in a generally horizontal orientation as shown in FIG. 12. On the beginning of the retraction cycle, the inner tonneau cover 16 is moved to a generally vertical position to provide clearance for the passage of the retractable top 10. The inner tonneau cover 16 pivots on pivot pin 92 in a counter clockwise direction as viewed from the left side of the vehicle. The front tonneau cover control link 102 is driven by movement of the bell crank 98 in a downward and forward direction as the roof pivot bracket 46 is moved along the roof guide tracks 50 with the roof pivot bracket being guided in the roof guide tracks 50 by track follower members 48. As the front tonneau cover control link 102 is moved by the bell crank to a position in front of the pivot pin 92, the inner tonneau cover 16 is pulled down to a generally horizontal orientation as shown in FIG. 14. Rear tonneau cover control links 106 connect the bell crank 98 to the rear tonneau cover control link flange 108. The bell crank rotates and carries the rear tonneau cover control link 106 that in turn supports the rear roof assembly 38. The bell crank 98 transfers the motive force of the rear roof assembly 38 to the tonneau cover and coordinates the movement of the retractable top 10 with the inner tonneau cover 16.

Figure 15:
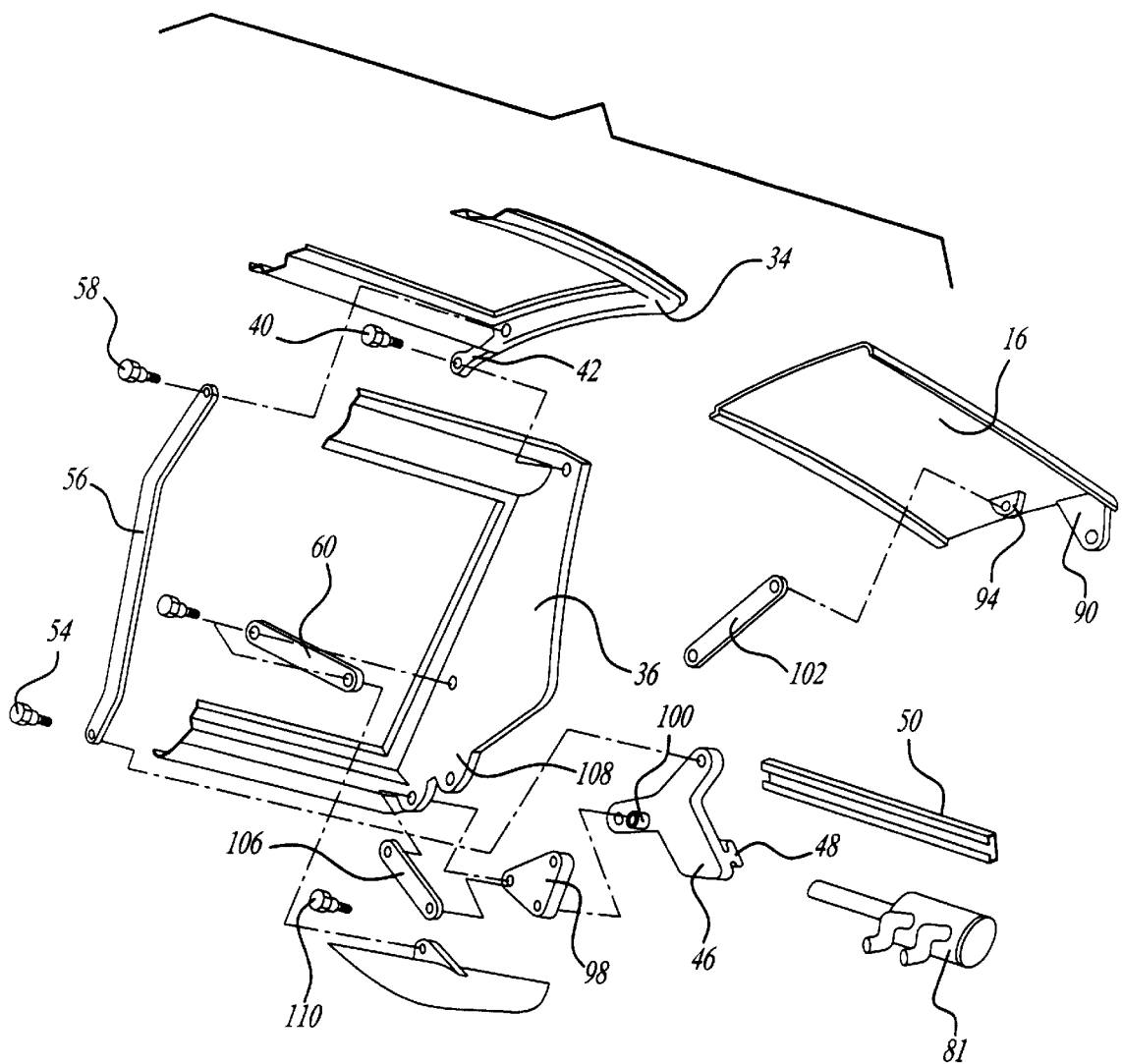
FIG. 15 is the partial exploded perspective view of one side of a retractable top and power inner tonneau cover and a portion of their associated linkages.

FIG. 15 is an exploded perspective view of the left side of the inner tonneau cover and its associated linkage to the retractable top 10. The drive illustrated in FIG. 15 is a hydraulic cylinder 81. The front pivot flange 90 and rear pivot link flange 94 are shown on the underside of the inner tonneau cover 16. Front tonneau cover control link 102 connects the rear pivot link flange 94 to the bell crank 98. Bell crank 98 includes three connection points. One connecting the bell crank 98 to the front tonneau cover control link 102, another connecting the bell crank 98 to the rear tonneau cover control link 106, and a third comprising pivot connector 112 connecting the bell crank 98 to the roof pivot bracket 46. Operation of the retractable top 10 and inner tonneau cover was previously described with reference to FIGS. 12–14.

Figure 16:
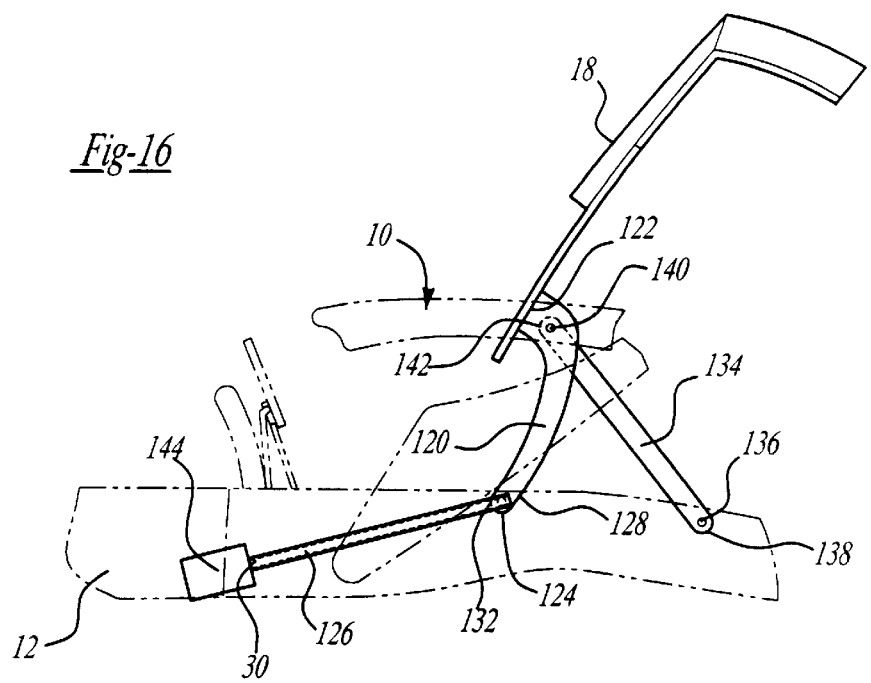
FIG. 16 is a fragmentary side elevation view of a vehicle having a trunk lid linkage made in accordance with the present invention in its fully raised position with the retractable top shown in phantom partially retracted.
Figure 17:
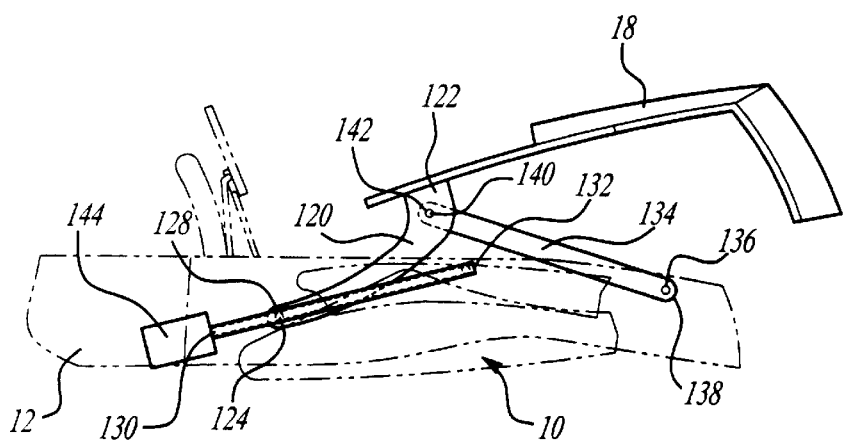
FIG. 17 is a fragmentary side elevation view of a vehicle having a trunk lid linkage made in accordance with the present invention partially closed with retractable top shown in phantom fully stowed.
Figure 18:
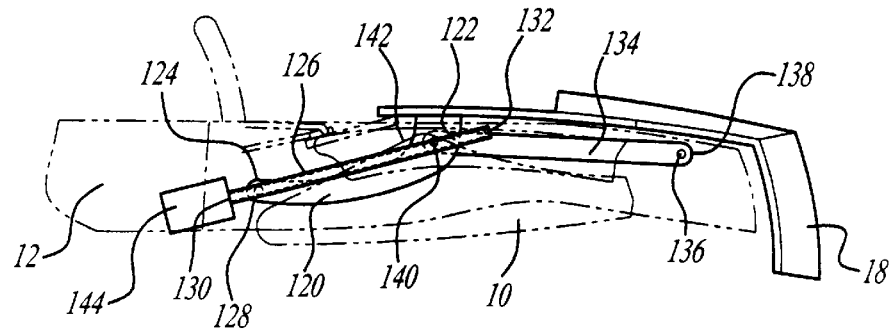
FIG. 18 is a fragmentary side elevation view of a vehicle having a trunk lid linkage made in accordance with the present invention closed over the retractable top shown in phantom in its fully retracted position.
Figure 19:
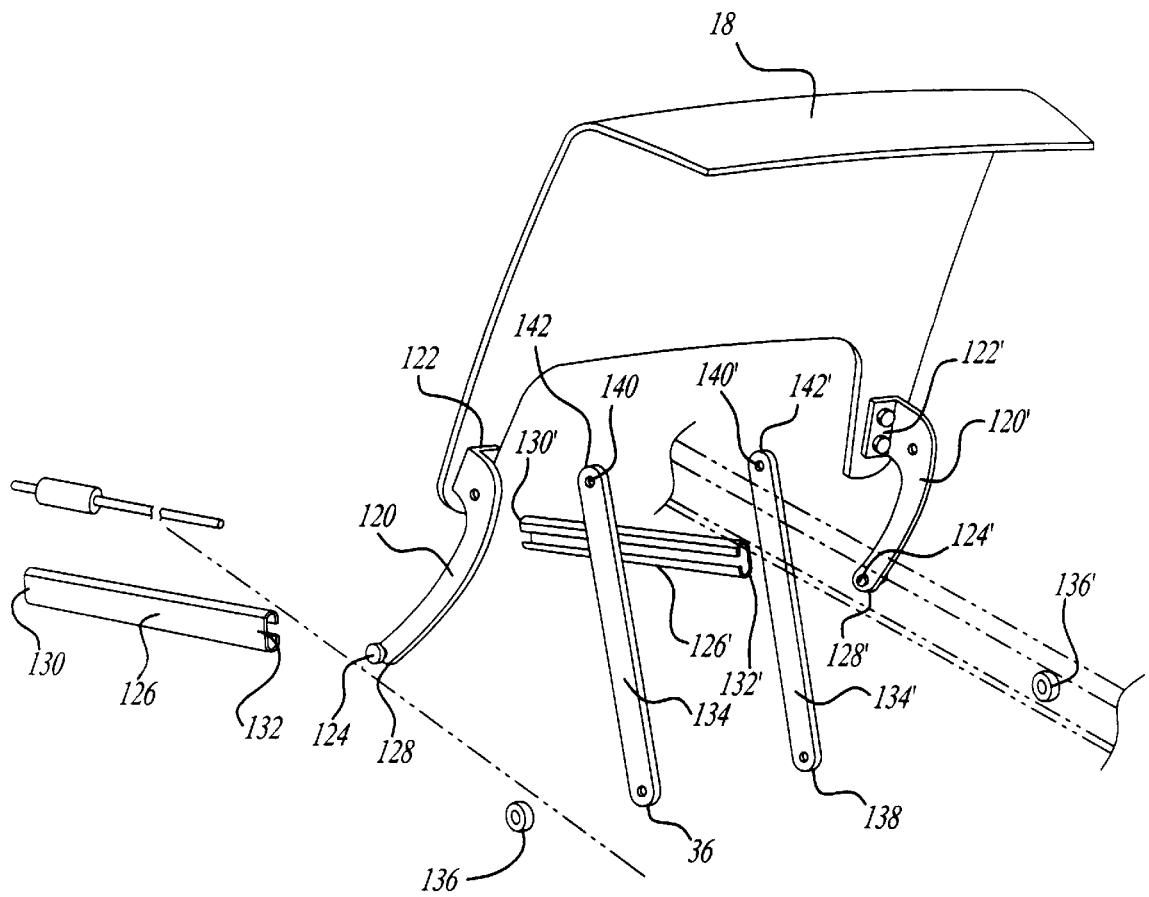
FIG. 19 is a exploded perspective view of a trunk lid and linkage made in accordance with the present invention.
Figure 20:
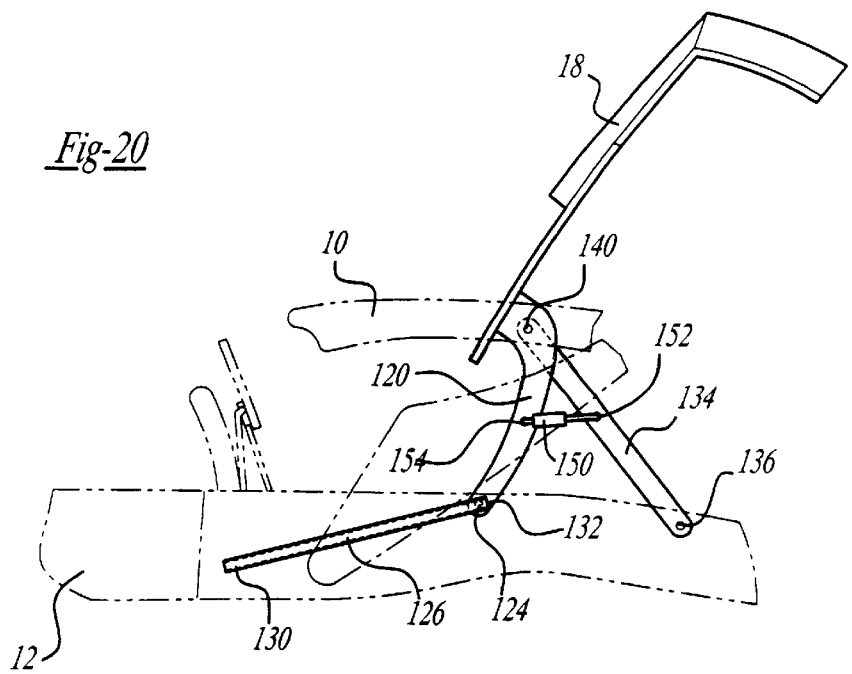
FIG. 20 is a fragmentary side elevation view of a vehicle having a trunk lid linkage with an alternative embodiment of the drive mechanism shown in its fully raised position with the retractable top shown in phantom partially retracted.
Figure 21:
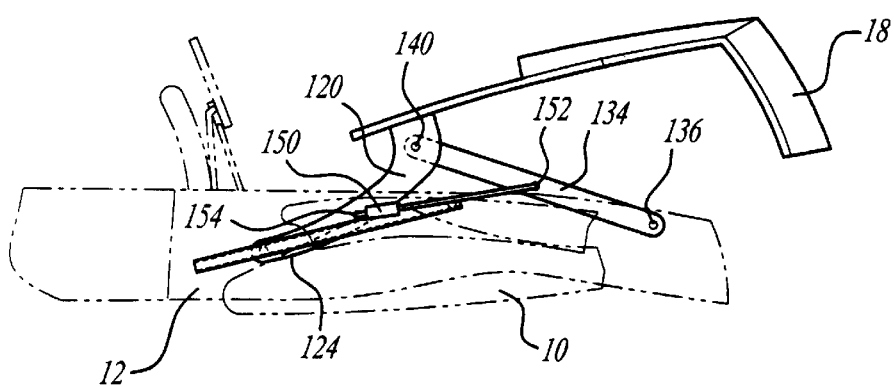
FIG. 21 is a side elevation view of a vehicle having a trunk lid made in accordance with the embodiment of FIG. 20 showing the trunk lid partially closed and the retractable top shown in phantom in its fully retracted position.

Referring now to FIGS. 16–19, the trunk lid assembly for a vehicle 12 and retractable top 10 is shown. Right and left sides of the trunk assembly are shown in FIG. 19 with the reference numerals for the left side of the vehicle being duplicated by the same reference numerals with a prime designation designating the corresponding parts on the right side of the vehicle. A description of the structure and operation of the trunk lid assembly will be made with reference to the left side with the understanding that the right side is a mirror image of the left side. The trunk lid 18 is connected by arcuate support arms 120 at the back end 122 of the arcuate support arms 120. A hinge roller 124 is received as a track 126 on the front end 128 of the arcuate support arms 120. The track 126 includes a forward end 130 and a rearward end 132. Referring to FIG. 16, the trunk lid is in its full open position and the hinge roller 124 is disposed in the rearward end 132 of the track 126. As shown in FIG. 17, with the trunk between its full opened and full closed position, the hinge roller 124 is located between the forward end 130 and the rearward end 132 of the track 126. As shown in FIG. 18, when the trunk is in its full closed position the hinge roller 124 is disposed near the forward end 130 of the track 126.

A control arm 134 is connected to the vehicle 12 by a pivot body connector 136 on its rearward end 138. A pivot arm connector 140 interconnects the control arm 134 to the arcuate support arm 120 on the forward end 142 of the control arm 134. A drive 144 is shown schematically at the forward end of the track 130. The drive 144 may be a hydraulic cylinder, a motor driven screw or other linear drive motor that would be capable of driving the hinge roller 124 longitudinally in the track 126.

Figure 22:
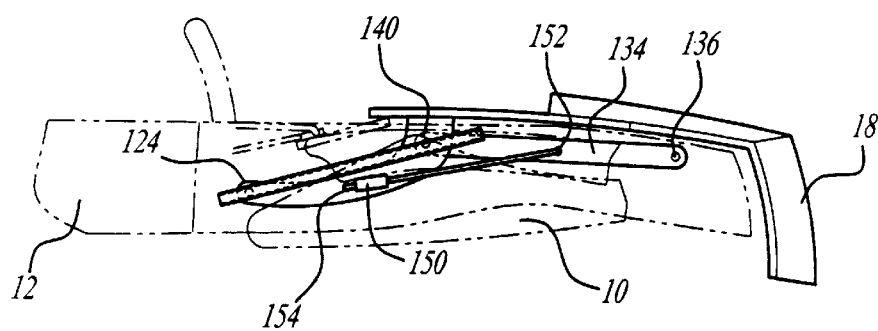
FIG. 22 is a side elevation view of the trunk lid made in accordance with the embodiment of FIG. 20 showing the trunk lid closed and the retractable top in its fully retracted position.
Figure 23:
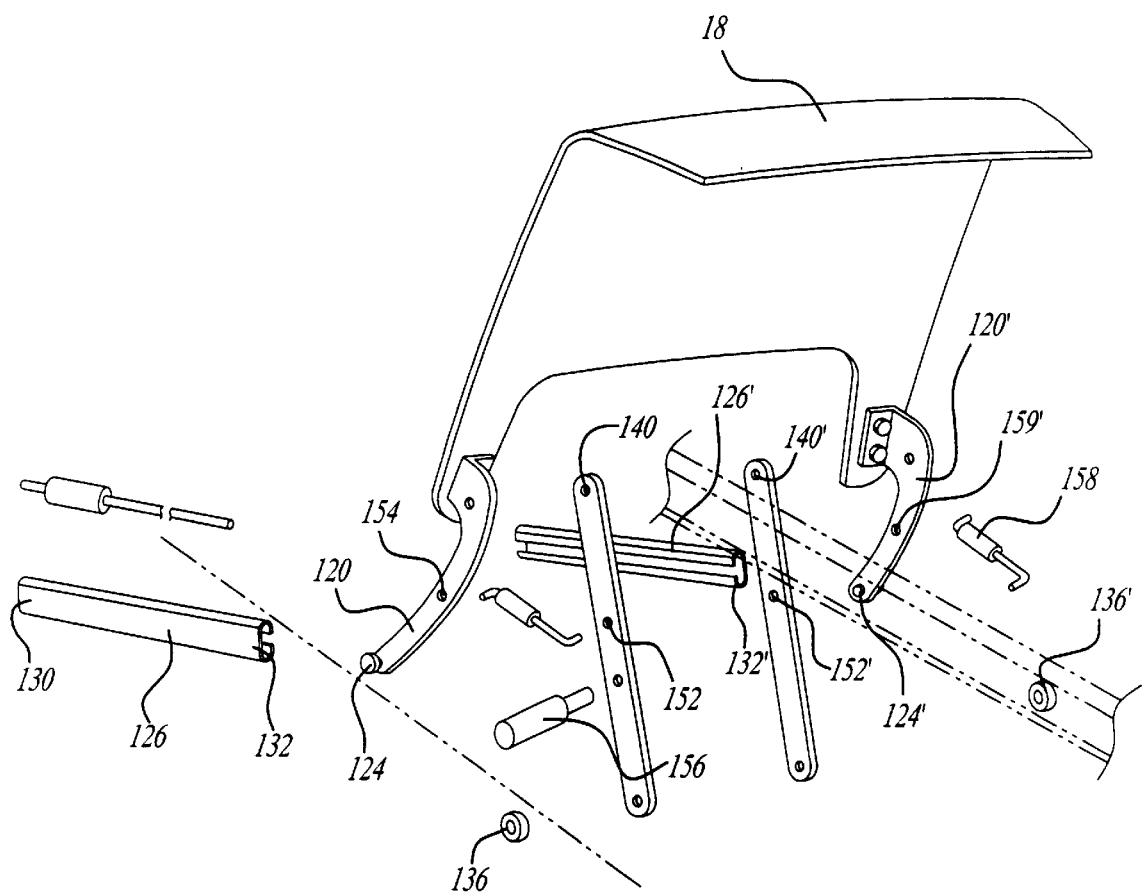
FIG. 23 is an exploded perspective view of the trunk lid and linkage made in accordance with the embodiment of FIG. 20 showing a drive system interconnecting two parts of the linkage.
Figure 24:
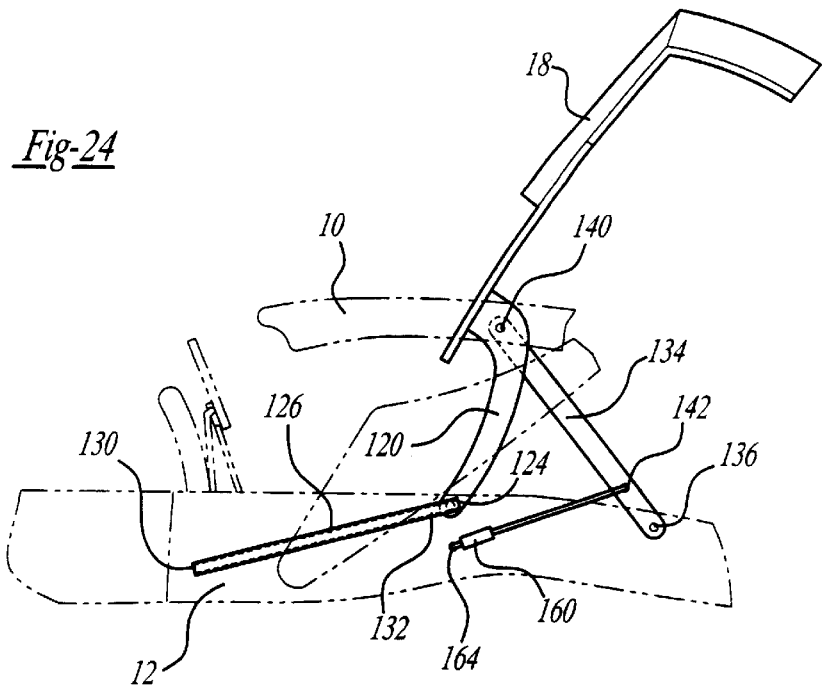
FIG. 24 is a fragmentary side elevation view of a vehicle and a trunk lid cover and linkage made in accordance with the present invention with an alternative embodiment of the drive mechanism shown in its fully raised position with the retractable top shown in phantom partially retracted.
Figure 25:
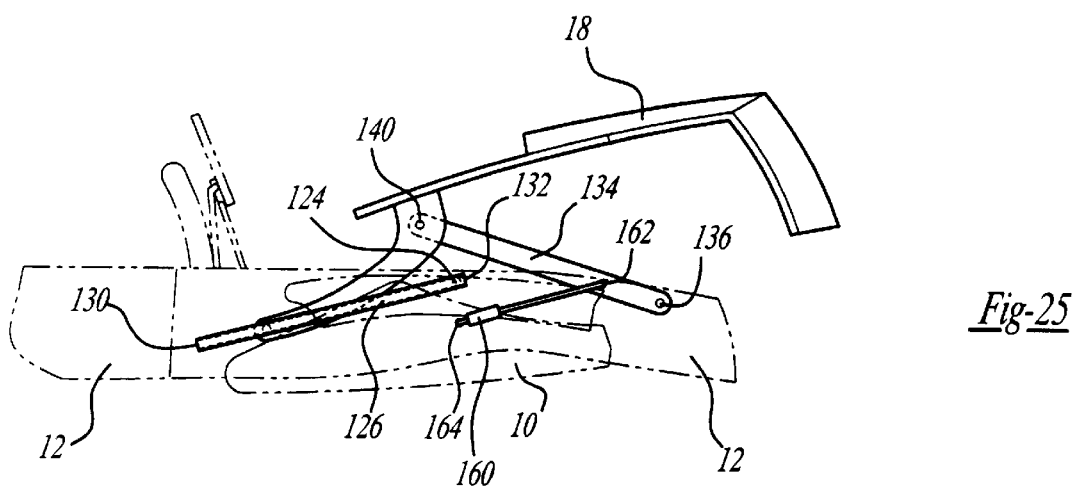
FIG. 25 is a fragmentary side elevation view of a vehicle and a trunk lid embodiment of FIG. 24 in its partially closed position with the roof shown in phantom in its fully retracted position.
Figure 26:
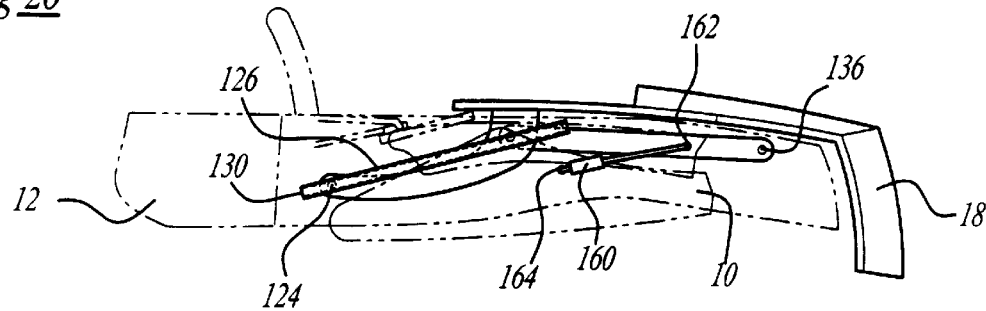
FIG. 26 is a fragmentary side elevation view of the vehicle and trunk lid cover according to the embodiment of FIG. 24 shown with the trunk lid closed over the retractable top in its fully retracted position.

Referring now to FIGS. 20–23. An alternative embodiment of the trunk lid assembly as shown. Once again the trunk lid assembly includes mirror image right and left sides that are shown in FIG. 23 in corresponding reference numerals on the right side of the vehicle are provided with the same reference numerals as used for the left side but include a prime designation. For brevity, the same reference numerals have been provided to similar components of the trunk lid assembly that were used for FIGS. 16–19. The trunk lid assembly includes a trunk lid 18 for a vehicle 12 that is provided with a retractable top 10. The trunk lid is moved rearwardly and upwardly by means of the arcuate support arm 120 that is connected by hinge roller 124 to a track 126. The hinge roller 124 is movable within the track 126 in the position shown in FIG. 20, the full up position, FIG. 21, the partially closed position, and FIG. 22 the fully closed position. A control arm 134 is connected to the vehicle by pivot body connector 136 and is connected to the arcuate support arm 120 by a pivot arm connector 140. In the embodiment of FIGS. 20–23, the drive mechanism shown is a hydraulic cylinder 150 connected between arcuate support arm 120 and control arm 134. The drive cylinder 150 is connected to an opening 152 on the control arm 134 and is connected to an opening 154 on arcuate support arm 120. The drive cylinder 150 contracts as the trunk lid is lifted and is expanded as the trunk lid is closed as shown in FIG. 22. An air spring 156 may be provided to assist lifting the trunk lid.

Figure 27:
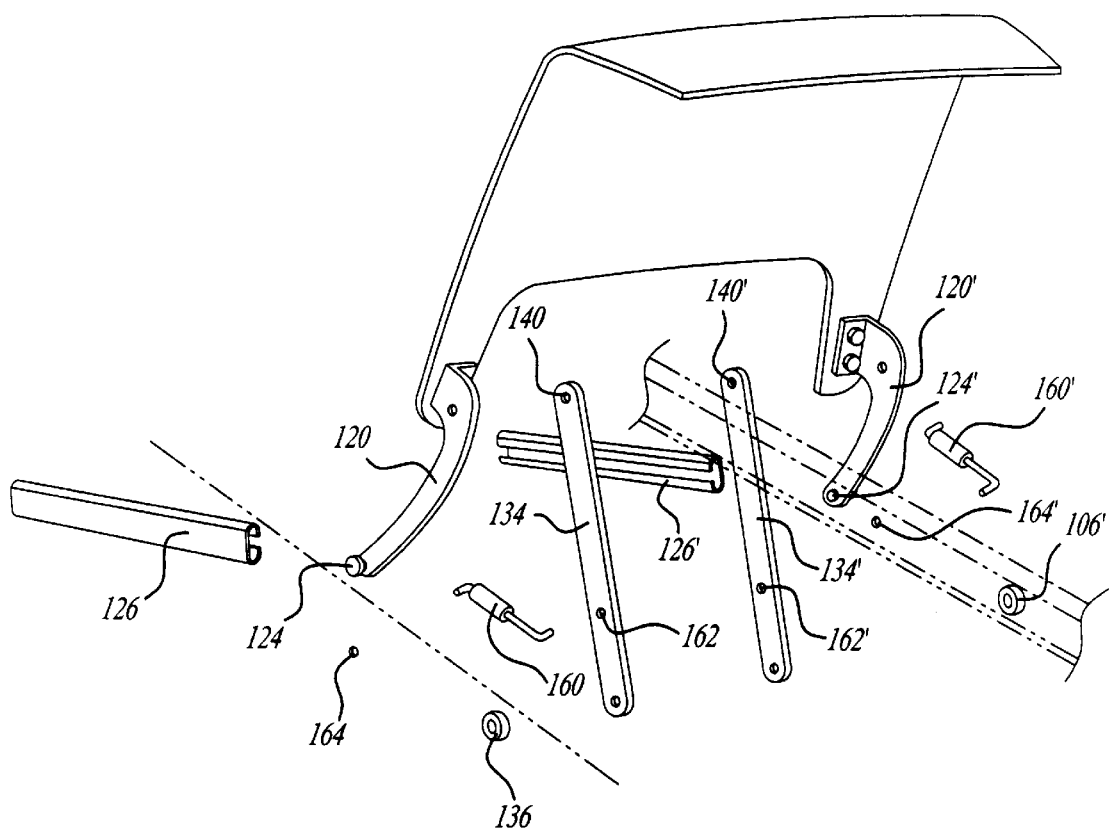
FIG. 27 is an exploded perspective view of the trunk lid and linkage made in accordance with the embodiment of FIG. 24 showing a drive system interconnecting a part of the linkage to the vehicle or frame.

Referring now to FIGS. 24–27, another alternative embodiment of the trunk lid assembly is shown. Once again the trunk lid assembly includes mirror image right and left sides that are shown in FIG. 27 with corresponding reference numerals on the right side of the vehicle being provided with the same reference numeral as used for the left side but including a prime designation. For brevity, the same reference numerals have been provided to similar components of the trunk lid assembly as were used for FIGS. 16–19. The trunk lid assembly includes a trunk lid 18 for a vehicle 12 that is provided with a retractable top 10. The trunk lid is moved rearwardly and upwardly by means of the arcuate support arm 120 that is connected by hinge roller 124 to a track 126. The hinge roller 124 is movable within the track 126 in the position shown in FIG. 24, the full open position, FIG. 25, the partially closed position, and FIG. 26 the fully closed position. A control arm 134 is connected to the vehicle or to the frame 14 in a modular construction by pivot body connector 136 and is connected to the arcuate support arm 120 by a pivot arm connector 140. In the embodiment of FIGS. 24–27, the drive mechanism is a drive cylinder 160 connected between arcuate support arm 120 and control arm 134. The drive cylinder 160 is connected to an opening 162 on the control arm 134 and is connected to an opening 164 on arcuate support arm 120. The drive cylinder 160 contracts as the trunk lid is lifted and is expanded as the trunk lid is closed, as shown in FIG. 22.

Figure 28:
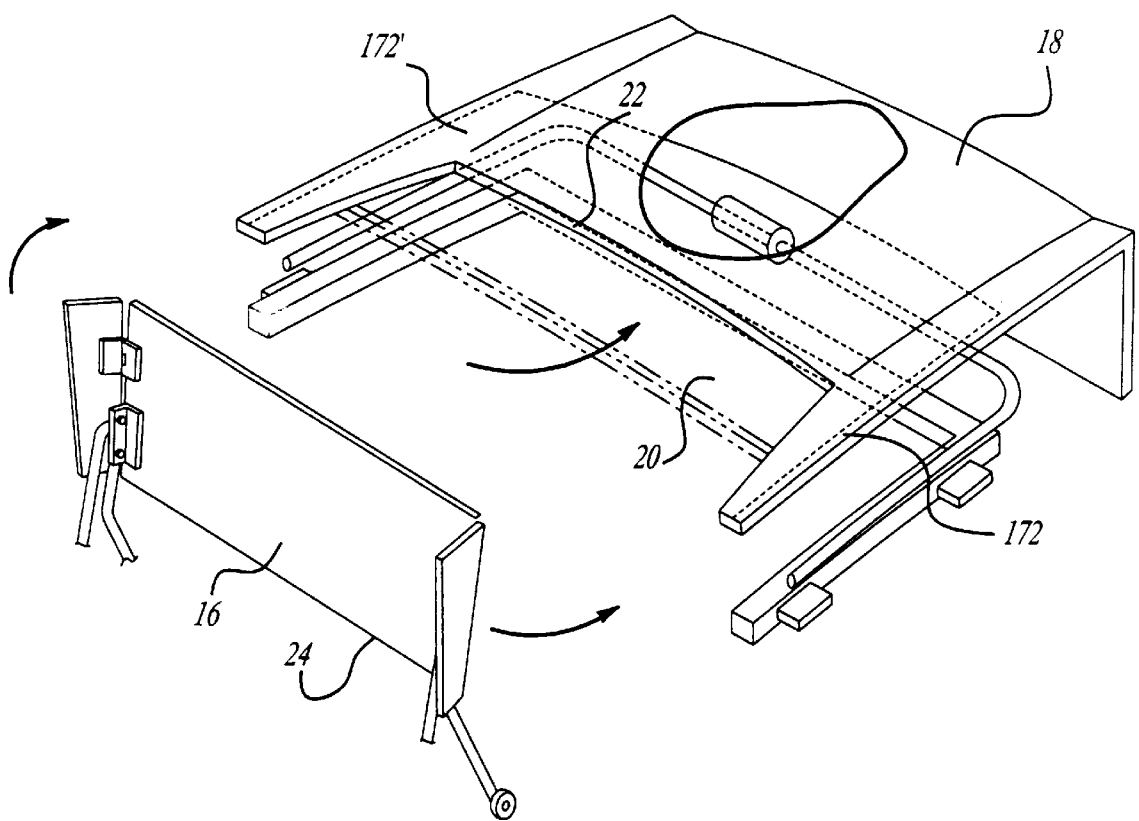
FIG. 28 is a perspective view of a trunk lid including a retractable outer tonneau cover formed as a part of the deck lid in conjunction with a moveable inner tonneau cover.

Referring now to FIG. 28, a trunk lid 18 is shown to include a rear tonneau cover 20 that is slidably received on tracks 172 and 172'. The outer tonneau cover 20 extends outwardly from the front edge 22 of the trunk lid 18 to expand the gap formed between the rear edge 24 of the inner tonneau cover 16 when it is in its horizontal position and the front edge 22 of the trunk lid 18. The outer tonneau cover is moved by a motor 174 and cables 176 on both sides of the trunk lid to move the outer tonneau 20 in the tracks 172 and 172'. The operation of the outer tonneau cover drive is similar in many respects to a sunroof drive wherein the outer tonneau slides and is lifted on links 178 when extended to be flush with the trunk lid 18.

While several embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable vehicle top system for a vehicle having a body and a passenger compartment comprising:
   a roof formed in at least two sections that are pivotally connected to each other and moveable between the top up position and the stowed position by a roof linkage to the vehicle body, the roof linkage including right and left roof pivot brackets, each having first and second portions pivotally connected respectively to the roof sections and a third portion slidably connected respectively to right and left roof guide tracks;
   wherein the top up position the roof covers the passenger compartment and a stowed position wherein the passenger compartment is uncovered, the two sections of the roof being adjoined in the top up position and being folded together in the stowed position, the roof pivot brackets being moved along the roof guide tracks as the roof is moved between the top up position and the stowed position.

2. The retractable vehicle top system of claim 1 wherein a motor is operatively connected to the roof linkage to move the top between the top up and stowed positions.

3. The retractable vehicle top system of claim 1 wherein:
   one section of the roof is a front roof assembly and the other section of the roof is a rear roof assembly;
   the linkage including right and left balance links, each balance link pivotally connecting a respective side of the front roof assembly to one of the first and second portions of the right and left roof pivot brackets to provide a balance link pivot mount;
   the linkage further including right and left control links, each control link connected to right and left body mounted pivots on a first end and to the rear roof assembly on a second end, the rear roof assembly being pivotally connected to the right and left roof pivot brackets, respectively.

4. The retractable vehicle top system of claim 3 wherein the control links are each pivotally connected proximate a lower portion of the rear roof assembly at a pivot mount located on the rear roof assembly.

5. The retractable vehicle top system of claim 1 wherein:
one section of the roof is a front roof assembly and the other section of the roof is a rear roof assembly;
the linkage including right and left balance links, each balance link pivotally connecting a respective side of the front roof assembly to one of the first and second portions of the right and left roof pivot brackets to provide a balance link pivot mount;
the linkage further including right and left control links, each control link connected to right and left body mounted pivots on a first end and to an intermediate pivot connector on the balance link between the front roof assembly and the roof pivot brackets.

6. The retractable vehicle top system of claim 3 wherein the roof pivot brackets each guide movement of the front and rear roof assemblies relative to the right and left roof guide tracks, the balance link connecting the roof pivot brackets to the front roof assembly to move the front and rear roof assemblies between their top up and folded positions, the roof pivot brackets guiding a lower edge of the rear roof assembly along the right and left roof guide tracks forward and downward into a storage compartment of the trunk as the front roof assembly is folded toward the rear roof assembly.

7. A retractable vehicle top system for a vehicle having a body and a passenger compartment comprising:
a roof having a front roof assembly and a rear roof assembly that are pivotally connected to each other by a roof linkage to the vehicle body, the roof linkage including right and left roof pivot brackets that are pivotally connected to right and left sides of the vehicle body by right and left roof pivot members that are received in right and left roof guide tracks, the roof guide tracks being inclined, the right and left roof pivot brackets having a pivot connection to the rear roof assembly and the right and left roof pivot brackets being pivotally connected to right and left balance links, the balance links being pivotally connected to the front roof assembly;
the roof having a top up position wherein the roof covers the passenger compartment and a stowed position wherein the passenger compartment is uncovered, the two sections of the roof being adjoined in the top up position and being folded together in the stowed position, the roof pivot brackets being moved along the roof guide tracks and held in substantially the same angular orientation as the roof is moved between the top up position and the stowed position while the rear roof assembly rotates about the pivot connection of the right and left roof pivot brackets to the rear roof assembly.

8. The retractable top system of claim 7 further comprising right and left control links pivotally connected to right and left body mount pivots on the vehicle and pivotally connected to the right and left sides of the rear roof assembly, respectively.

9. The retractable top system of claim 7 further comprising right and left control links pivotally connected to right and left body mount pivots on the vehicle and pivotally connected to the right and left balance links, respectively.

10. A retractable vehicle top system for a vehicle having a body, a trunk, and a passenger compartment comprising:
a roof formed in at least two sections that are pivotally connected to each other by a roof linkage to the vehicle body, the roof linkage including right and left roof pivot brackets each having first and second portions pivotally connected respectively to the roof sections and a third portion that is shiftably received by right and left roof guide tracks;
a trunk lid connected to both sides of the vehicle body by a trunk lid linkage, the trunk lid linkage including right and left moveable trunk lid pivot members that are received in right and left trunk lid tracks, the moveable trunk lid pivot members being connected to the trunk lid and the vehicle body;
the roof having a top up position wherein the roof covers the passenger compartment and a stowed position wherein the passenger compartment is uncovered, the two sections of the roof being adjoined in the top up position and being folded together in the stowed position, the roof pivot brackets being moved along the roof guide tracks as the roof is moved between the top up position and the stowed position; and
the trunk lid having a closed position wherein the trunk lid covers the trunk, and a trunk open position wherein access is provided to the trunk and wherein the moveable trunk lid pivot members are shifted rearwardly and upwardly by moving the trunk lid pivot members in the trunk lid tracks from the position that the members are in when in the closed position and when in the open position to thereby provide clearance for the roof as the roof is moved between the top up position and the stowed position.

11. The retractable vehicle top system of claim 10 wherein a motor is operatively connected to the top linkage to move the top between the top up and stowed positions.

12. The retractable vehicle top system of claim 11 wherein a second motor is operatively connected to the trunk lid linkage to move the trunk lid into and out of the roof guide position.

* * * * *